(12) United States Patent  (10) Patent No.: US 6,281,922 B1
Suzuki                    (45) Date of Patent: Aug. 28, 2001

(54) IMAGE FORMING APPARATUS

(75) Inventor: Takayoshi Suzuki, Kanagawa (JP)

(73) Assignee: Fuji Xerox Co., LTD, Tokyo (JP)

( * ) Notice: Subject to any disclaimer, the term of this patent is extended or adjusted under 35 U.S.C. 154(b) by 0 days.

(21) Appl. No.: 09/251,992

(22) Filed: Feb. 18, 1999

(30) Foreign Application Priority Data

Feb. 19, 1998 (JP) .................................. 10-037091

(51) Int. Cl.[7] ................ B41J 2/47; B41J 2/435
(52) U.S. Cl. .......................... 347/235; 347/233
(58) Field of Search .................... 347/115, 116, 347/117, 232, 233, 235, 249, 250; 399/301

(56) References Cited

U.S. PATENT DOCUMENTS

| 4,862,196 | * | 8/1989 | Umeda et al. | 347/232 |
| 4,950,889 | * | 8/1990 | Budd et al. | 347/235 X |
| 5,055,860 | * | 10/1991 | Bannai | 347/249 |
| 5,426,528 | * | 6/1995 | Yamamoto et al. | 347/235 X |
| 5,825,522 | * | 10/1998 | Takano et al. | 347/233 X |
| 5,852,293 | * | 12/1998 | Iwasaki et al. | 347/250 X |
| 5,872,586 | * | 2/1999 | Shio | 347/116 |
| 6,011,256 | * | 1/2000 | Takada | 347/233 X |

FOREIGN PATENT DOCUMENTS 63-47718   2/1988 (JP) .

* cited by examiner

Primary Examiner—Sandra Brase
(74) Attorney, Agent, or Firm—Finnegan, Henderson, Farabow, Garrett & Dunner, L.L.P.

(57) ABSTRACT

An image forming apparatus containing a divisional scanning type optical scanner. In the apparatus, if displacement of one line in a subscanning direction occurs in a joint of image formation areas, light sources are controlled so as to modulate and emit light beams based on image data of the scanning line shifted one line at the same point of time. If displacement of 0.5 pixels in a main scanning direction occurs in a joint of image formation areas, the emission start timing of one light beam is shifted by the scanning time as long as 0.5 pixels with respect to the emission start timing of the other light beam, thereby correcting the displacement amount in the main scanning direction.

3 Claims, 13 Drawing Sheets

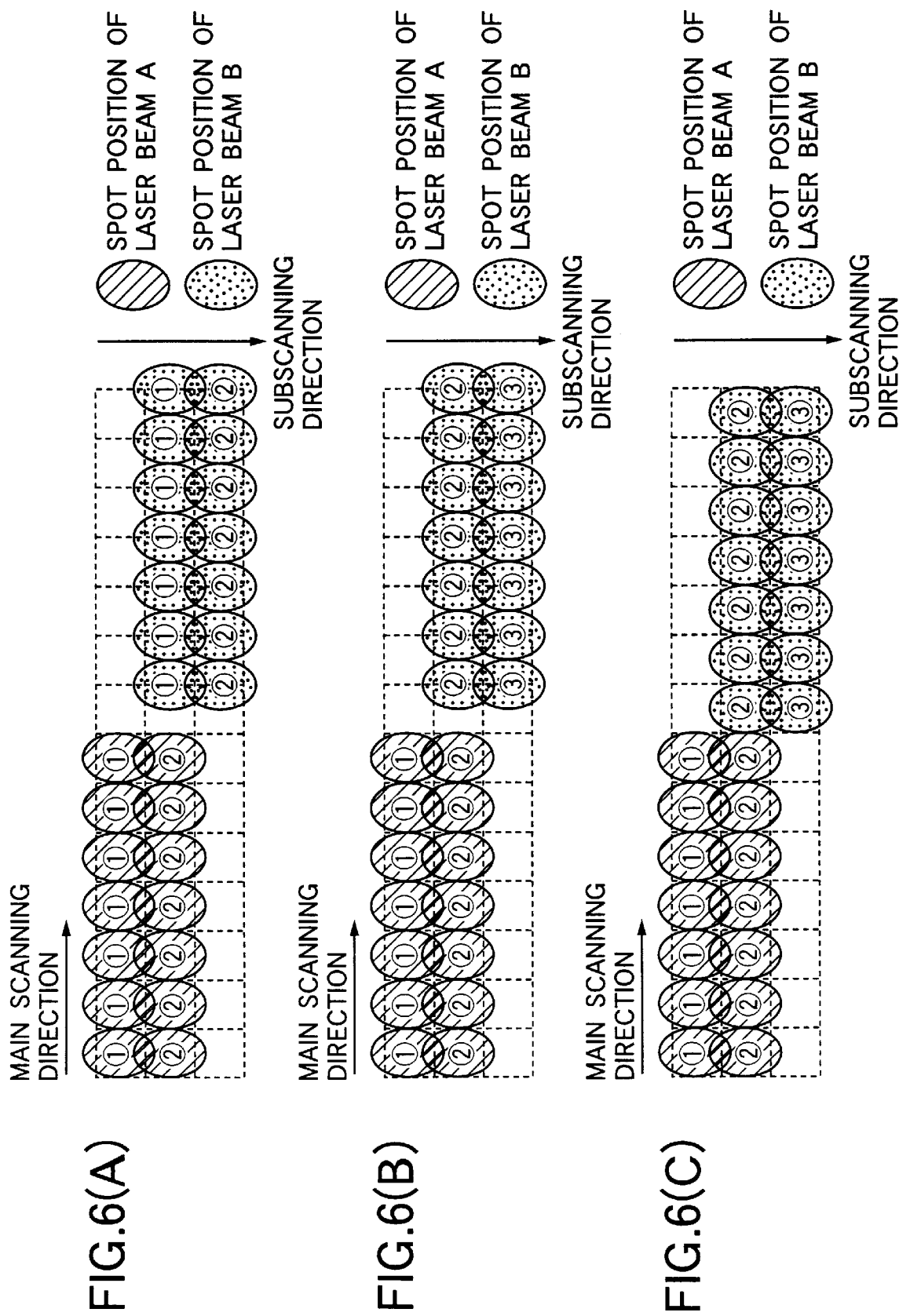

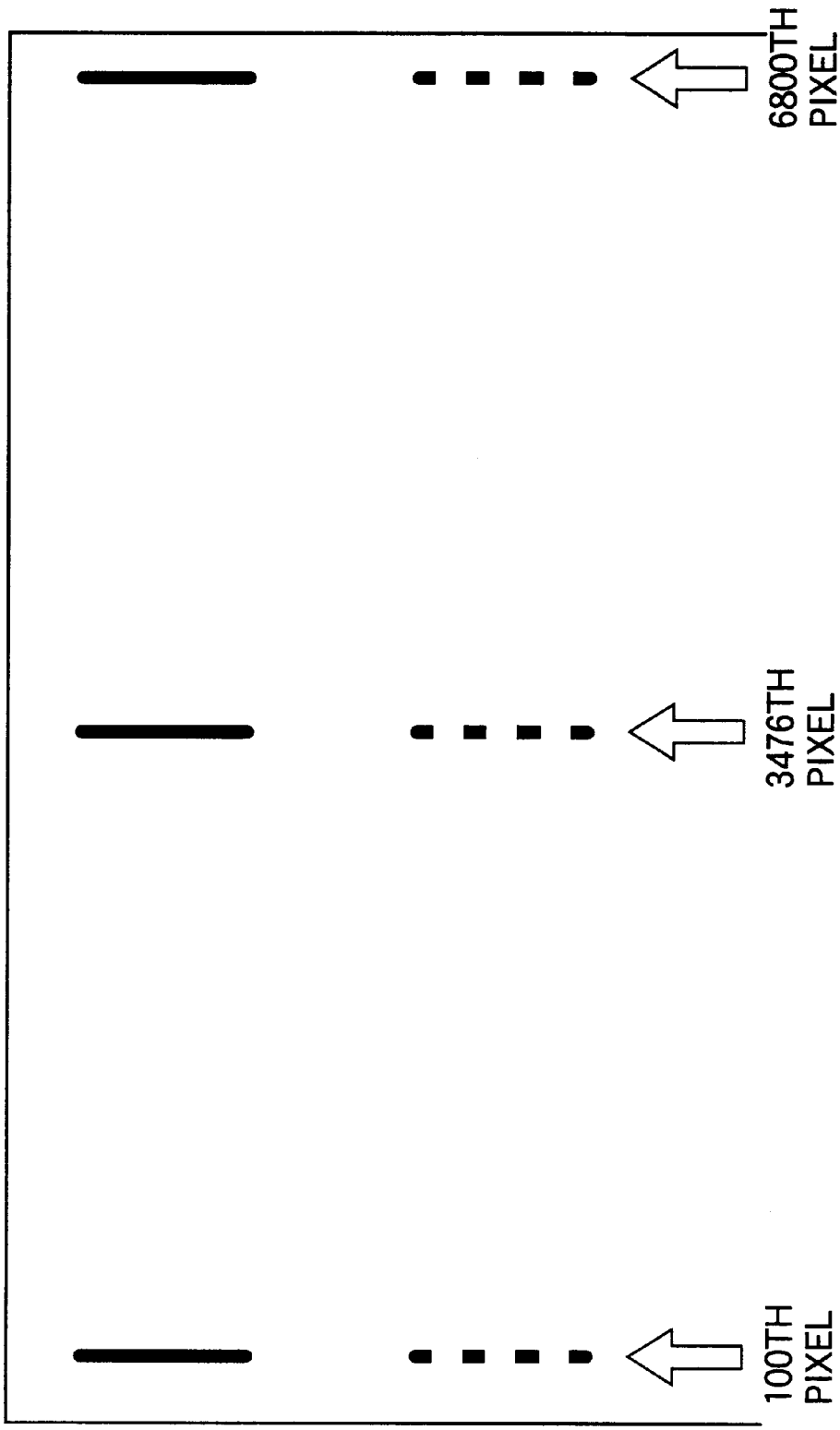

IMAGE FORMING APPARATUS

BACKGROUND OF THE INVENTION

1. Field of the Invention

This invention relates to an image forming apparatus and more particularly to an image forming apparatus comprising an optical scanner for deflecting light beams emitted from a plurality of light sources by a single deflector (for example, a rotating polygon mirror), dividing one scanning line on an image carrier (for example, a photosensitive drum) whose surface moves in a predetermined direction by the deflected light beams, and scanning the light beams over the line in a main scanning direction.

2. Description of the Related Art

Hitherto, an optical scanner for emitting light beams from two light sources, deflecting the two emitted light beams by a polygon mirror, dividing one scanning line on a photosensitive body by the two deflected light beams, and scanning the light beams over the line has been proposed (refer to Japanese Patent Unexamined Publication No. Sho. 63-47718).

The optical scanner scans one light beam over the first half of an image area of the photosensitive body and the other beam over the latter half of the image area of the photosensitive body. The scanning line is thus divided by two light beams and the light beams are scanned, whereby the number of images of the polygon mirror can be increased and the print speed can be improved without upsizing the optical scanner.

By the way, to divide one scanning line by two light beams and scan the light beams, if an image formed by scanning one light beam is assumed to be one panel image, images formed by scanning two light beams are formed as a set of panel images.

The light beams are generated from light sources placed at different positions and arrive at the photosensitive body over different passages. Thus, the placement positions of the light sources, the positions of the parts making up the light sources, the positions of optical systems placed on the passages, and the like are displaced due to external causes such as temperature change, vibration, and shock, and the light beam passage may shift from a predetermined passage.

If the light beam passage thus shifts, a discontinuous image occurs in the joint between panel images formed by scanning the light beams and it is feared that the image quality may be degraded remarkably.

The images formed from light sources on both sides of the joint according to image signals having the same number of clocks may differ in length (namely, a partial magnification difference may occur), and to form a multicolor image, it is feared that a color misregistration may be caused.

SUMMARY OF THE INVENTION

It is therefore an object of the invention to provide an image forming apparatus that can avoid degradation of image quality in a joint if a light beam passage shifts from a predetermined passage or a partial magnification difference occurs.

In order to achieve the above object, according to the invention, there is provided an image forming apparatus comprising: a plurality of light sources each for modulating and emitting a light beam based on image data at an operation speed responsive to a predetermined clock; an optical scanner for deflecting the light beams emitted from the plurality of light sources by a single deflector, dividing one scanning line on an image carrier rotating in a predetermined direction by the deflected light beams, and scanning the light beams over the line in a main scanning direction; a detector for detecting a position displacement amount in a boundary portion of areas over which the light beams are scanned; and a controller for controlling light beam emission start timings from the light sources or clock frequencies corresponding to the light sources so as to eliminate a displacement amount in the main scanning direction if the position displacement amount detected by the detector contains the displacement amount in the main scanning direction, and for controlling the light sources so as to modulate and emit the light beams based on image data of a scanning line shifted as many lines as the number of lines responsive to a displacement amount in a rotation direction of the image carrier If the position displacement amount contains the displacement amount along the rotation direction.

In the image forming apparatus, each of the light sources modulates and emits a light beam based on image data at the operation speed responsive to a predetermined clock. The optical scanner deflects the light beams emitted from the light sources by a single deflector (for example, a rotating polygon mirror), divides one scanning line on the image carrier by the deflected light beams, and scans the light beams over the line in the main scanning direction. Since the image carrier rotates in the predetermined direction (corresponding to a subscanning direction), a plurality of light beams are scanned over the surface of the image carrier.

The detector detects a position displacement amount in the boundary portion of the areas over which the light beams are scanned.

If the position displacement amount detected by the detector contains a displacement amount in the main scanning direction, the controller controls the light beam emission start timings from the light sources or the clock frequencies corresponding to the light sources so as to eliminate the displacement amount in the main scanning direction.

For example, to scan two light beams over the image carrier, one light beam emission start timing is delayed or moved up with respect to the other light beam emission start timing, whereby the scan area over which one light beam is scanned is displaced along the main scanning direction for correcting the displacement amount in the main scanning direction. The clock frequency of one light source may be increased or decreased for changing the width along the main scanning direction of the scan area over which one light beam is scanned, thereby correcting the displacement amount in the main scanning direction.

On the other hand, if the position displacement amount contains a displacement amount along the rotation direction of the image carrier, the controller controls the light sources so as to modulate and emit the light beams based on image data of a scanning line shifted as many lines as the number of lines responsive to the displacement amount in the rotation direction.

For example, to scan two light beams over the image carrier, if the positions of the areas over which the light beams are scanned are displaced three scanning lines along the rotation direction of the image carrier, the controller controls the light sources so as to modulate and emit the light beam based on image data of a predetermined scanning line by one light source and at the same time, modulate and emit the light beam based on image data of the scanning line shifted three lines from the predetermined scanning line by the other light source.

Thus, if position displacement occurs in the boundary portion of the areas over which the light beams are scanned, it can be corrected with accuracy in the main scanning direction and in the rotation direction of the image carrier (subscanning direction) and degradation of image quality in the boundary portion of the areas over which the light beams are scanned can be avoided.

Further, according to the invention, there is provided an image forming apparatus comprising: a plurality of light sources each for modulating and emitting a light beam based on image data at an operation speed responsive to a predetermined clock; an optical scanner for deflecting the light beams emitted from the plurality of light sources by a single deflector, dividing one scanning line on an image carrier rotating in a predetermined direction by the deflected light beams, and scanning the light beams over the line in a main scanning direction; a scan distance detector for detecting a scan distance of each light beam along the main scanning direction within a predetermined time; and a frequency controller for controlling clock frequencies corresponding to the light sources so that the scan distances of the light beams detected by the scan distance detector become equal to each other.

In the image forming apparatus, each of the light sources modulates and emits a light beam based on image data at the operation speed responsive to a predetermined clock. The optical scanner deflects the light beams emitted from the light sources by a single deflector, divides one scanning line on the image carrier by the deflected light beams, and scans the light beams over the line. Since the image carrier rotates in the predetermined direction (corresponding to the subscanning direction), the light beams are scanned over the surface of the image carrier.

The scan distance detector detects the scan distance of each light beam along the main scanning direction within a predetermined time.

Since the clock frequency of one light source can be increased or decreased for changing the width along the main scanning direction of the scan area over which the light beam from the light source is scanned, the frequency controller controls the clock frequencies corresponding to the light sources so that the detected scan distances of the light beams become equal to each other.

If a correction is thus made so that the scan distances of the light beams within the predetermined time become equal to each other, the partial magnification difference in the main scanning direction can be corrected and degradation of image quality in the boundary portion of the areas over which the light beams are scanned can be avoided.

According to the invention, it is made possible to effectively correct a color misregistratiopn particularly in a multicolor image forming apparatus.

BRIEF DESCRIPTION OF THE DRAWINGS

In the accompanying drawings:

FIG, 5(A) is an illustration to show data input/output to/from one gap memory

FIG. 6(A) is an illustration to show a joint state before correction, FIG. 6(B) is an illustration to show the joint state after displacement in a subscanning direction is corrected, and FIG. 6(C) is an illustration to show the joint state after displacement in a main scanning direction is corrected;

FIG. 13 is an illustration to show a state after color misregistration caused by a partial magnification difference is corrected.

DETAILED DESCRIPTION OF THE PREFERRED EMBODIMENTS

Referring now to the accompanying drawings, there is shown an embodiment of an image forming apparatus according to the invention.

[Configuration of Color Image Forming Apparatus]

Figure 1:
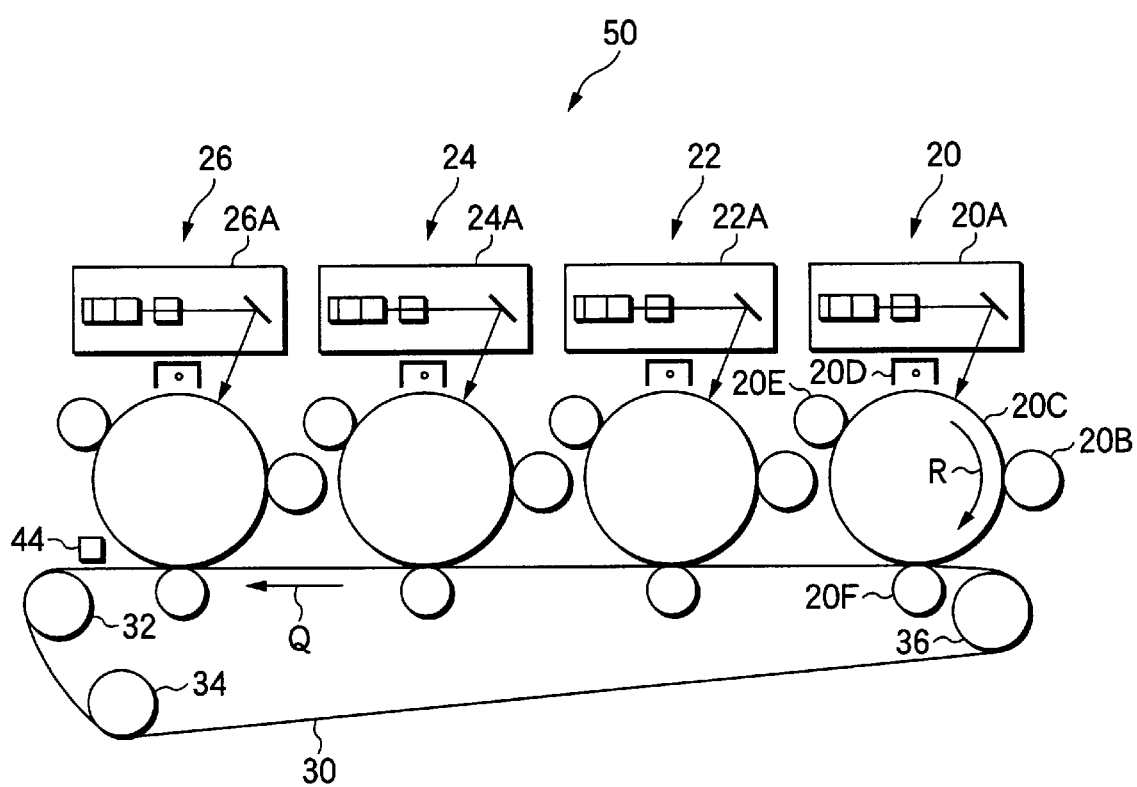
FIG. 1 is a schematic diagram to show the configuration of an image forming apparatus in an embodiment of the invention.

First, the configuration of a color image forming apparatus in the embodiment will be described. As shown in FIG. 1, a color image forming apparatus 50 is provided with an intermediate transfer belt 30 like an endless belt, a yellow image forming section 20 for forming a yellow toner image on the intermediate transfer belt 30, a magenta image forming section 22 for forming a magenta toner image on the intermediate transfer belt 30, a cyan image forming section 24 for forming a cyan toner image on the intermediate transfer belt 30, and a black image forming section 26 for forming a black toner image on the intermediate transfer belt 30.

The yellow image forming section 20 is provided with a photosensitive body 20c which is substantially like a cylinder, rotates about the center axis in the direction of arrow R, and has an outer peripheral surface in contact with the intermediate transfer belt 30. The outer peripheral surface of the photosensitive body 20C is surrounded by a charger 20D for charging the outer peripheral surface at a predetermined potential, an optical scanner 20A for modulating laser light based on image data and applying the modulated laser light to the outer peripheral surface of the photosensitive body 20C, thereby forming a latent image corresponding to the yellow component of the image, a developing unit 20B for developing the formed latent image, a transfer unit 20F for transferring the yellow toner image visualized by developing of the developing unit 20B to the intermediate transfer belt 30, and a cleaning unit 20E for removing toner from the outer peripheral surface of the photosensitive body 20C in order along the direction of arrow R.

As seen in FIG. 1, the configuration of each of other image forming sections, namely, the magenta image forming section 22, the cyan image forming section 24, and the black image forming section 26 is similar to that of the yellow image forming section 20.

The intermediate transfer belt 30 is a dielectric substance with volume resistance adjusted by carbon to electrostatically transfer a developed toner image and is circulatingly transported in a predetermined direction by drive rolls 32, 34, and 36 (direction of arrow Q between the rolls 32 and 36).

The four image forming sections are placed above the intermediate transfer belt 30 in the order of the yellow image forming section 20, the magenta image forming section 22, the cyan image forming section 24, and the black image forming section 26 along the direction of arrow Q. Registration detection sensors 44 for detecting registration detection marks 45 (FIG. 7) described later are placed downstream in the direction of arrow Q from the black image forming section 26.

A transfer unit (not shown) for transferring a color image transferred onto the intermediate transfer belt 30 to paper is placed at a predetermined position on the circulating passage of the intermediate transfer belt 30 and the paper to which the color image is transferred by the transfer unit is transported to a fuser (not shown) and undergoes fusing processing by the fuser, then is discharged to a predetermined paper tray.

[Configuration of Optical Scanner]

Next, the configuration of the optical scanner 20A of the yellow image forming section 20 will be described. The configuration of each of optical scanners 22A, 24A, and 26A of other image forming sections shown in FIG. 1 is similar to that of the optical scanner 20A and therefore will not be described.

Figure 2:
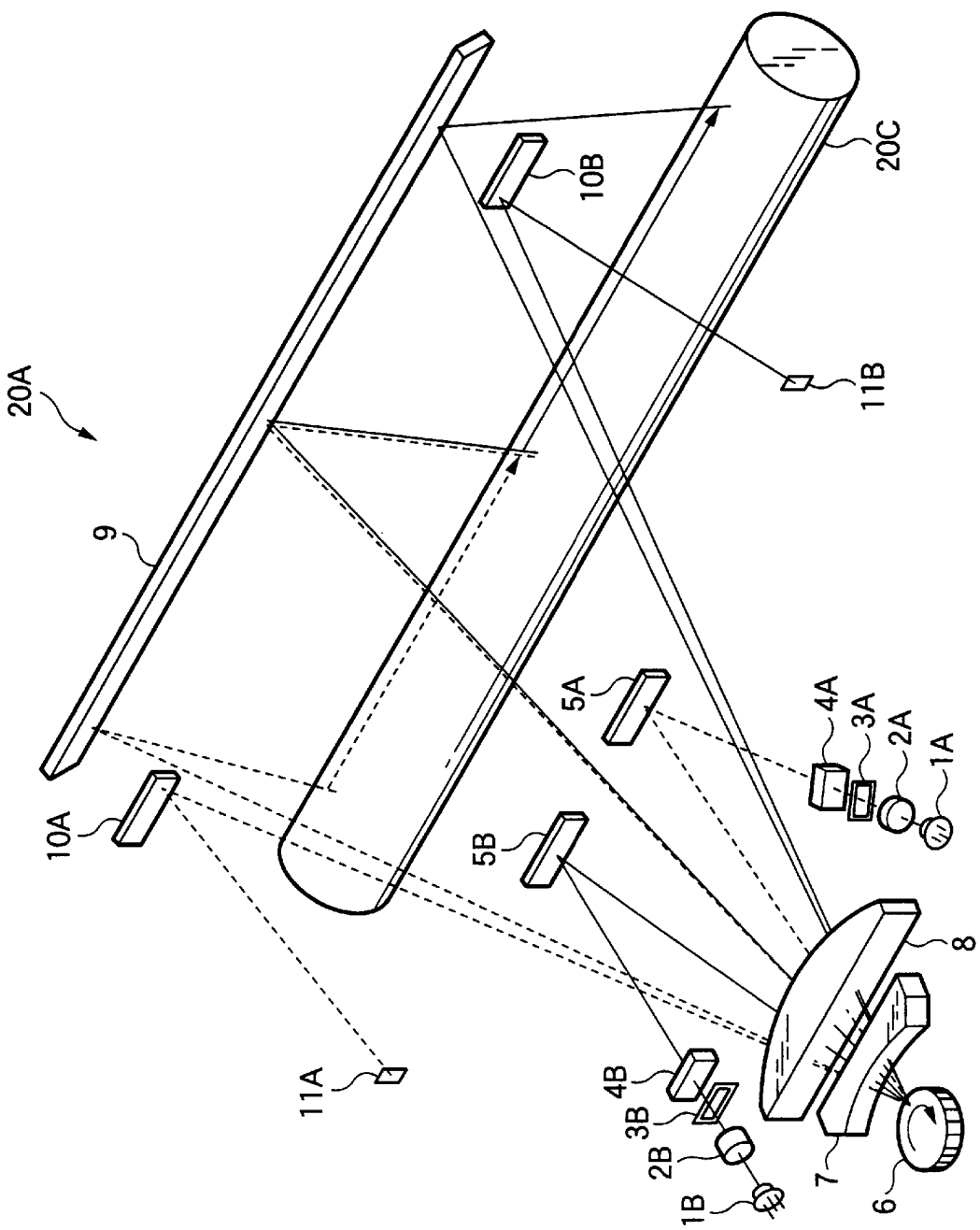
FIG. 2 is a schematic diagram to show the configuration of an optical scanner of one color image forming section.

As shown in FIG. 2, in the optical scanner 20A, a laser beam emitted from a semiconductor laser 1A, which will be hereinafter referred to as laser beam A, blinks in accordance with image data and passes through a collimator lens 2A, a slit 3A, a cylinder lens 4A, a mirror 5A, and fθ lenses 8 and 7, then is incident on a polygon mirror 6. The polygon mirror 6 rotates, whereby the laser beam A is scanned, passes through the fθ lenses 7 and 8, is reflected on a cylinder mirror 9, and is scanned over the first half of an image area of the photosensitive body 20C.

Likewise, a laser beam emitted from a semiconductor laser 1B, which will be hereinafter referred to as laser beam B, blinks in accordance with image data and passes through a collimator lens 2B, a slit 3B, a cylinder lens 4B, a mirror 5B, and the fθ lenses 8 and 7, then is incident on the polygon mirror 6. The polygon mirror 6 rotates, whereby the laser beam B is scanned, passes through the fθ lenses 7 and 8, is reflected on the cylinder mirror 9, and is scanned over the latter half of the image area of the photosensitive body 20C.

The laser beams A and B are scanned by the same plane of the polygon mirror 6. A mirror 10A reflects the laser beam A before being scanned over the image area and applies the laser beam A to a start-of-scan (SOS) sensor 11A, which then generates an SOS signal as the start point of the writing timing in a main scanning direction. A mirror 10B reflects the laser beam B after being scanned over the image area and applies the laser beam B to an end-of-scan (EOS) sensor 11B, which then generates an EOS signal for defining the writing end timing in the main scanning direction.

[Flow of Image Data]

Next, a flow of image data and the configuration related thereto will be described with reference to FIG. 3.

Figure 3:
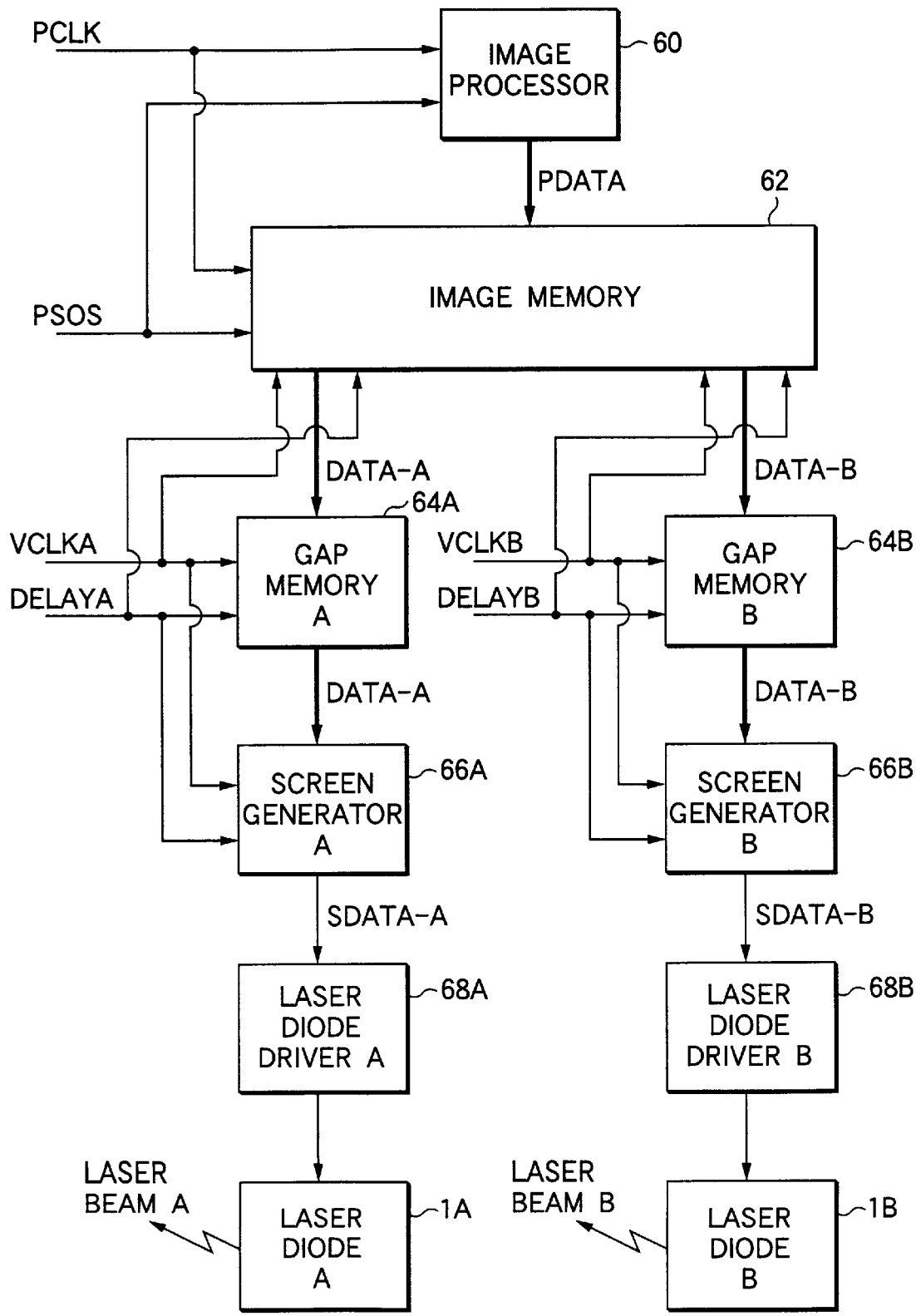
FIG. 3 is a block diagram to show a flow of image data and the configuration related thereto.

Raster-like image data sent from a printer interface unit (not shown) or an image input unit (not shown) is processed by an image processor 60 shown in FIG. 3 and is stored in an image memory 62. The image memory 62 may be formed of a semiconductor memory having a capacity of several lines or a disk unit having a capacity of several hundred pages.

Writing into the image memory 62 is executed in line units based on an image processing clock (PCLK) and an image processing start-of-scan signal (PSOS). Reading from the image memory 62 can be started separately at any desired position of one line based on read image clocks (VCLKA and VCLKB) and write timing control signals (DELAYA and DELAYB).

Figure 4:
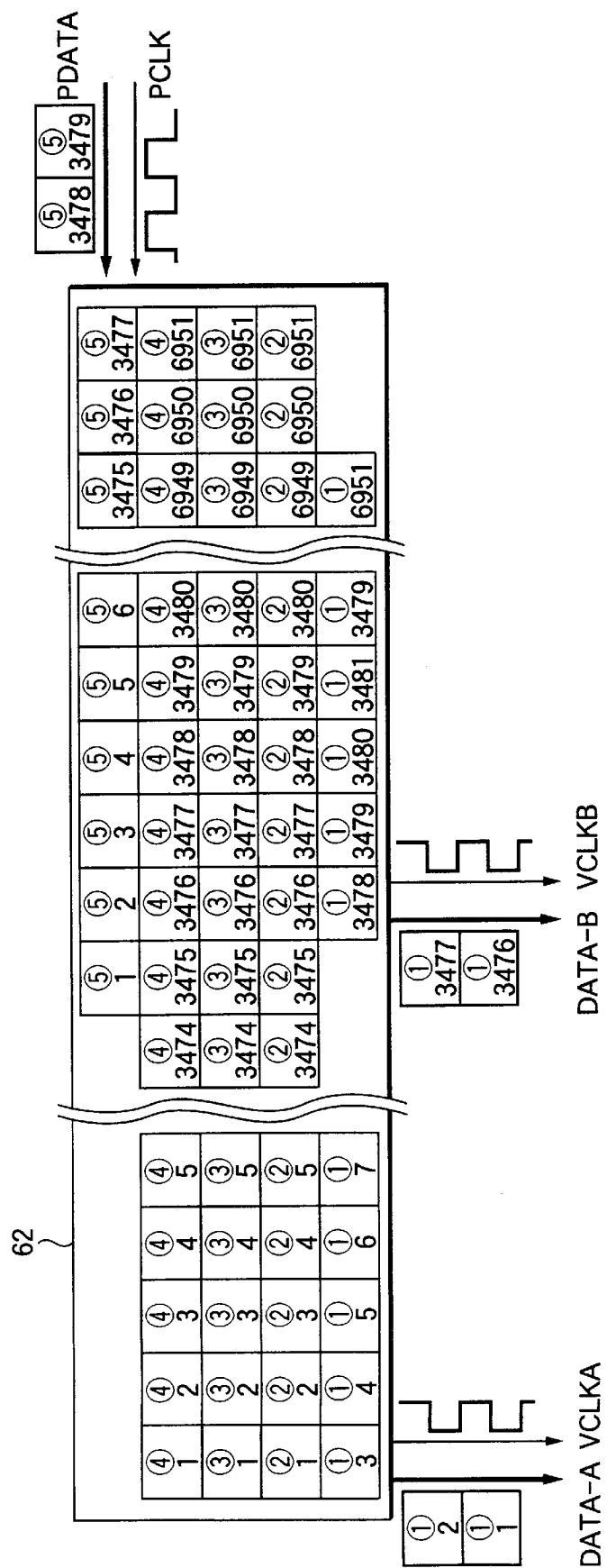
FIG. 4 is an illustration to show data input/output to/from an image memory.

The operation of the image memory 62 will be described with reference to FIG. 4. Image data (PDATA) is written into the image memory 62 for one line at a time in accordance with the PCLK and the PSOS (not shown). From the image memory 62, image data (DATA-A) is read in accordance with the VCLKA and the DELAYA (not shown) and image data (DATA-B) is read in accordance with the VCLKB and the DELAYB (not shown).

The embodiment assumes that the number of data pieces of one line is 6951 and that the data pieces of the DATA-A are numbered 1-3475 and the data pieces of the DATA-B are numbered 3476-6951. The read start positions and the data piece numbers of the DATA-A and DATA-B are stored in a register (not shown) and can be changed in response to a condition.

The write timings of the DATA-A and DATA-B read from the image memory 62 with one line divided are adjusted in gap memories 64A and 64B in FIG. 3.

Figure 5A:
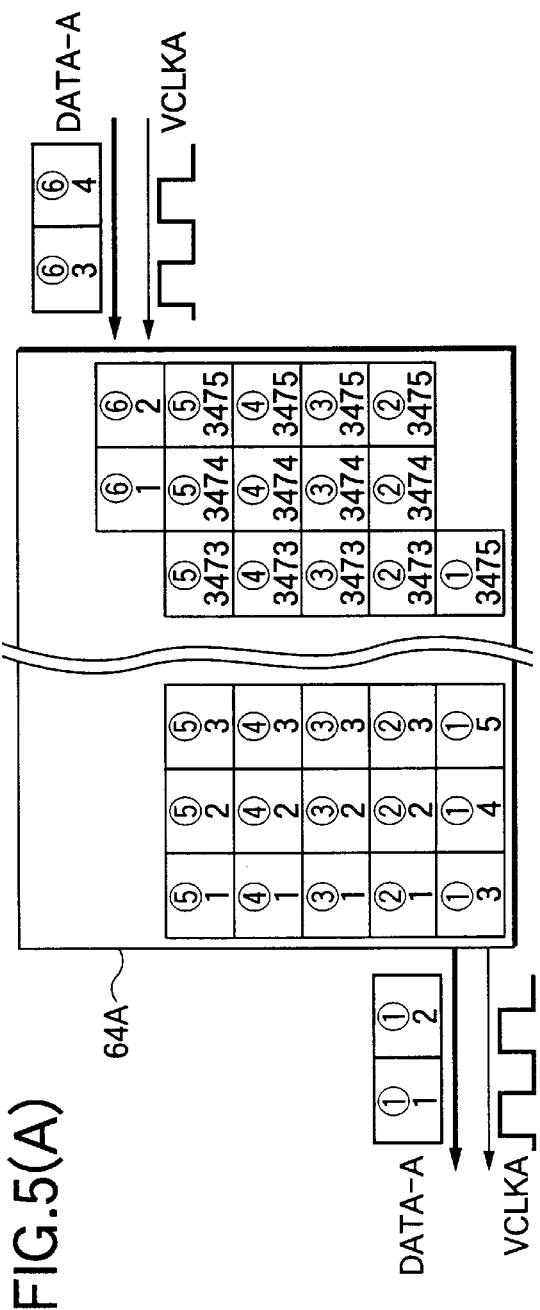
FIG. 5(B) is an illustration to show data input/output to/from the other gap memory.
Figure 5B:
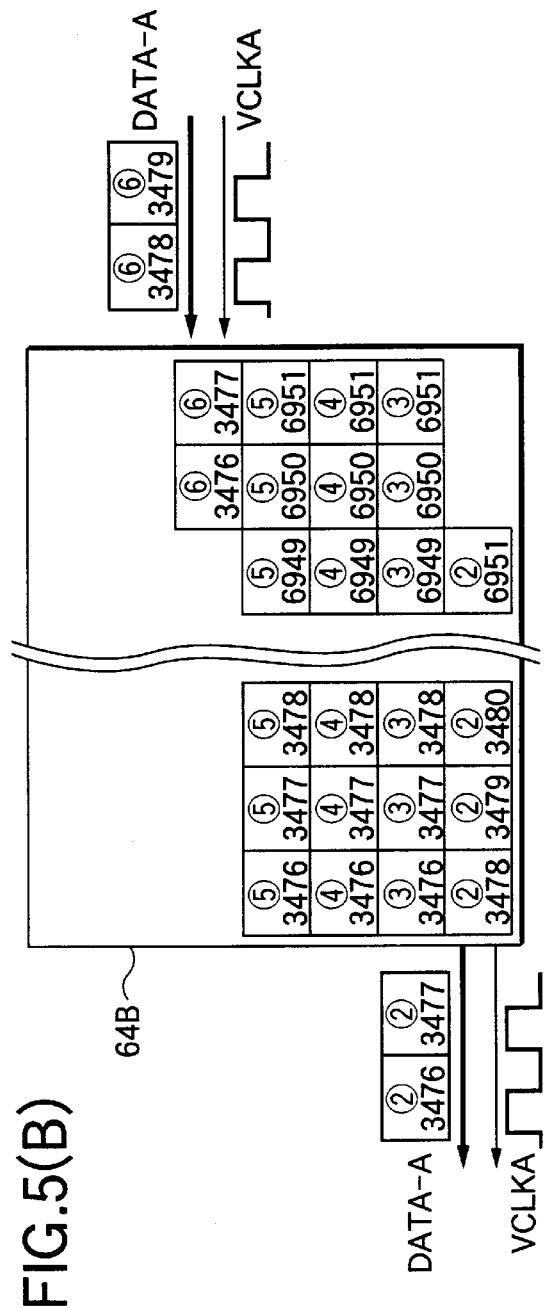

As shown in FIGS. 5(A) and 5(B), each of the gap memories 64A and 64B has a capacity of more than one line and the addresses of write lines of the laser beams A and B are changed, whereby the addresses of the lines read at the same time can be made different. In the following description, the dot addresses in the main scanning direction are defined as 1, 2, 3, . . . and the line addresses in the subscanning direction are defined as ①, ②, ③. . . .

In the embodiment, writing is controlled so that the gap memory 64A stores six-line data and the gap memory 64B stores five-line data. At this time, on the read side, when the image data of line ① is read from the gap memory 64A, the image data of line ② is read from the gap memory 64B.

The image data of different lines is thus read from the gap memories 64A and 64B at the same time, whereby it is made possible that the laser beams A and B write the image data of lines at different addresses at the same scan timing.

As shown in FIG. 3, the image data read from the gap memory 64A is binarized by a screen generator 66A, then is converted into current switching by a laser diode driver 68A and a laser diode 1A blinks in response to the current switching. Likewise, the image data read from the gap memory 64B is binarized by a screen generator 66B, then is converted into current switching by a laser diode driver 68B and a laser diode 1B blinks in response to the current switching.

[Function of Embodiment]

Next, an example of correcting position displacement in the boundary portion of image formation areas over which the laser beams A and B are scanned will be described as the function of the embodiment.

The optical scanner 20A shown in FIG. 2 divides one line in the main scanning direction by the two laser beams A and B and scans the laser beams A and B over the line. At this time, a scanning line joint of the laser beams A and B occurs in the vicinity of the center of an image. Since the laser beams A and B arrive at the photosensitive body 20C through different optical parts, the scanning line joint of the laser beams A and B may be discontinuous depending on variations in the attachment positions and the like of the optical parts, as shown in FIG. 6(A).

FIG. 6(A) shows an initial state just after the optical scanner 20A is assembled. The scanning line of the laser beam B is 0.5 dots ahead in the main scanning direction and 1.0 dot behind in the subscanning direction with respect to the scanning line of the laser beam A.

Figure 7:
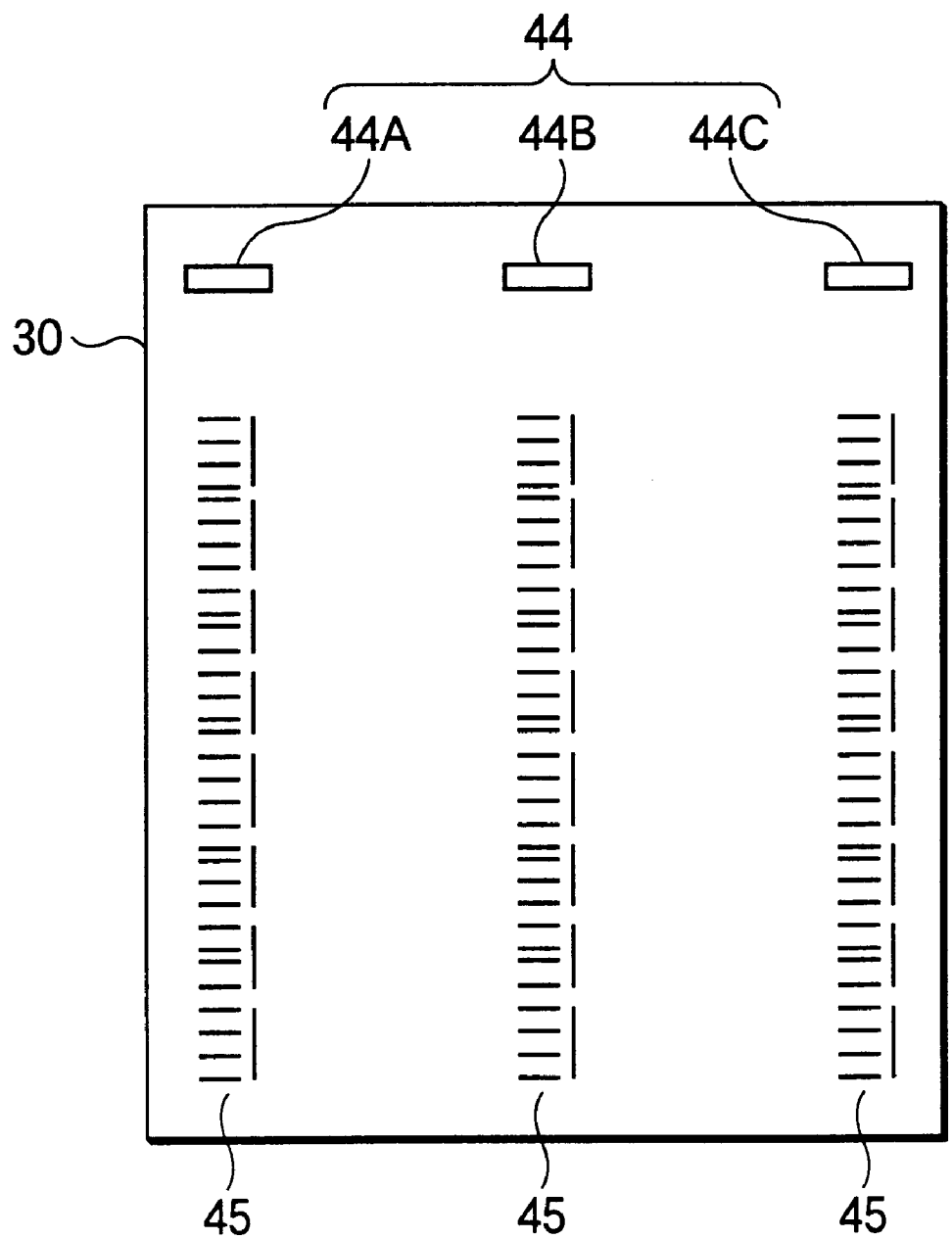
FIG. 7 is an illustration to show registration detection sensors and registration detection marks.

The position displacement of the scanning lines of the laser beams A and B can be detected by the registration detection sensors 44 which detect the registration detection marks 45 formed on the transfer belt 30 as shown in FIG. 7. That is, the registration detection sensors 44A and 44C are placed at both ends of an image and the registration detection sensor 44B is placed in the center of the image (joint) and the registration detection marks 45 formed on the intermediate transfer belt 30 are read, whereby the position displacement amount of the image in the joint and relative color misregistration amount for each color are detected. However, the position displacement of the scanning lines of the laser beams A and B may be detected by visually checking the printed-out image.

Since the scanning line of the laser beam B is 1.0 dot behind in the subscanning direction with respect to the scanning line of the laser beam A as shown in FIG. 6 (A), the gap memories 64A and 64B are used to correct the position displacement so as to write a scanning line based on image data one line ahead of the laser beam A by the laser beam B, as described above.

Specifically, as shown in FIG. 6(B), the position displacement in the subscanning direction is corrected by writing line ① of the laser beam A and line ② of the laser beam B and line ② of the laser beam A and line ③ the laser beam B at the same time.

The scanning line of the laser beam B is 0.5 dots ahead in the main scanning direction with respect to the scanning line of the laser beam A as shown in FIG. 6(A). To correct the position displacement, the time between an SOS signal and the image write start is moved up 0.5 dots with respect to the scanning of the laser beam B.

Figure 8:
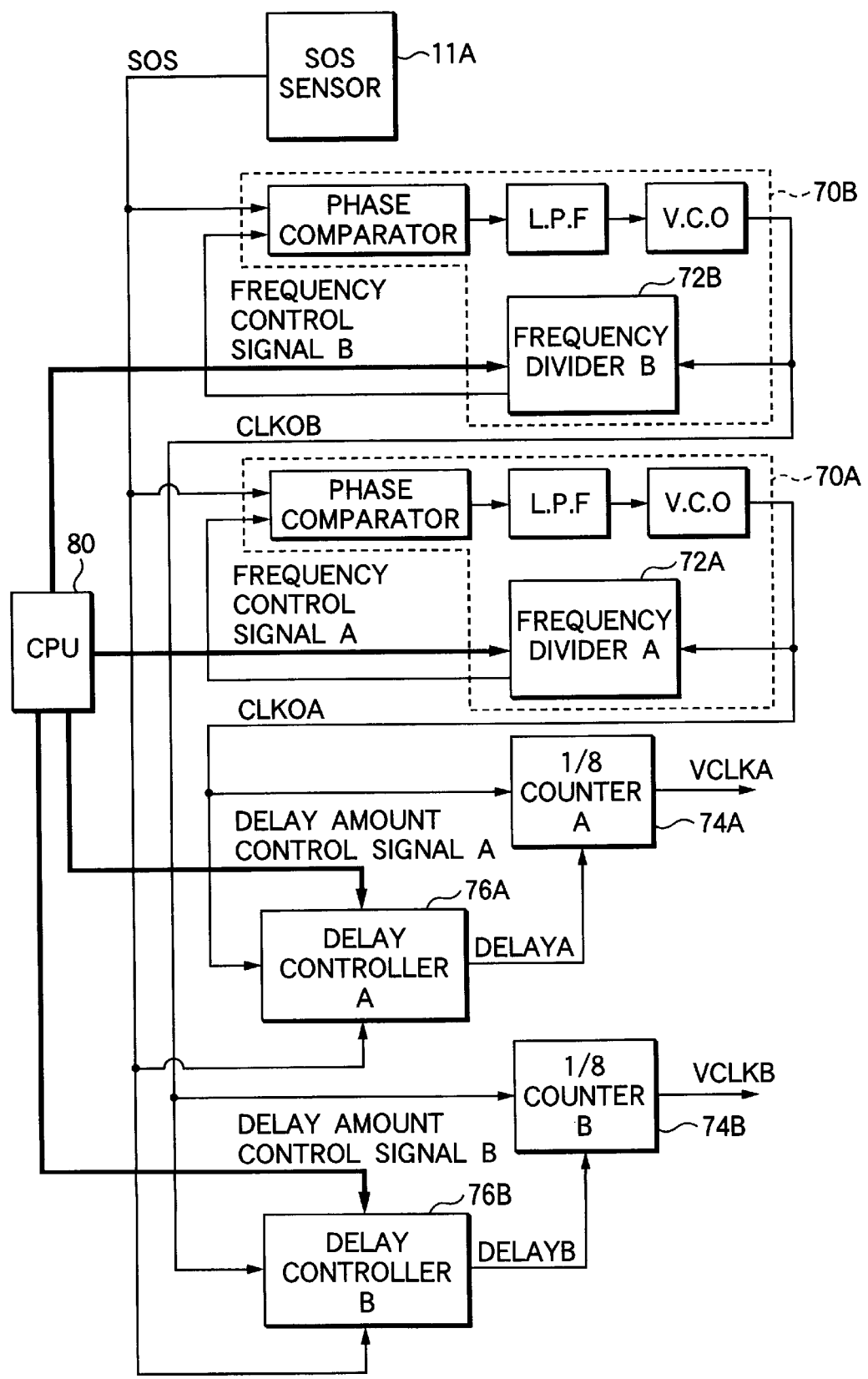
FIG. 8 is a block diagram to show the configuration related to displacement correction in the main scanning direction.

The correction method will be described in detail with reference to FIG. 8. An image clock CLKOA corresponding to the laser beam A is generated by a PLL synthesizer 70A with the SOS signal as a reference clock and oscillation frequency can be controlled based on the value set in a frequency divider 72A according to a frequency control signal A. The image clock CLKOA generated by the PLL synthesizer 70A is input to a ⅛ counter 74A and a delay controller 76A for the laser beam A. The delay controller 76A generates a write timing control signal DELAYA as a reset signal of the ⅛ counter 74A in accordance with a delay amount control signal A set by a CPU 80.

Likewise, an image clock CLKOB corresponding to the laser beam B is generated by a PLL synthesizer 70B with the SOS signal as a reference clock and oscillation frequency can be controlled based on the value set in a frequency divider 72B according to a frequency control signal B. The image clock CLKOB generated by the PLL synthesizer 70B is input to a ⅛ counter 74B and a delay controller 76B for the laser beam B. The delay controller 76B generates a write timing control signal DELAYB as a reset signal of the ⅛ counter 748 in accordance with a delay amount control signal B set by the CPU 80.

Figure 9:
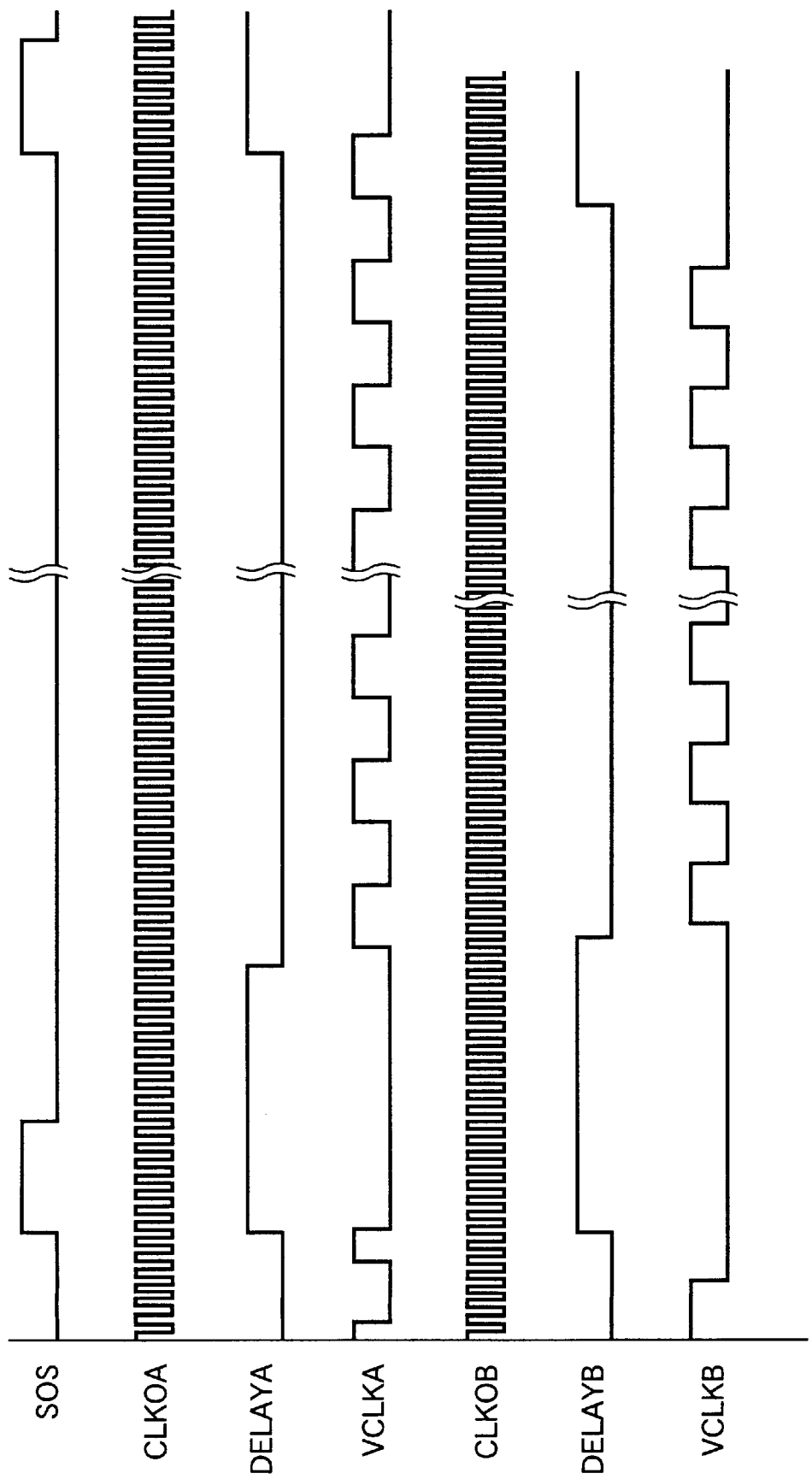
FIG. 9 is a timing chart related to displacement correction in the main scanning direction.

As shown in FIG. 9, the SOS signal is synchronized with the image clocks CLKOA and CLKOB by the PLL synthesizers 70A and 70B and the image clock CLK0A and CLK0B oscillates at the frequency eight times that of the corresponding image clock.

The delay controller 76A resets the write timing control signal DELAYA on the rising edge of the SOS signal and releases the reset state of the write timing control signal DELAYA after counting the number of clocks set by the delay amount control signal A from the falling edge of the SOS signal. After the reset state of the write timing control signal DELAYA is released, the ⅛ counter 74A generates an image clock VCLKA divided by eight.

Likewise, the delay controller 76B resets the write timing control signal DELAYB on the rising edge of the SOS signal and releases the reset state of the write timing control signal DELAYB after counting the number of clocks set by the delay amount control signal B from the falling edge of the SOS signal. After the reset state of the write timing control signal DELAYB is released, the ⅛ counter 74B generates an image clock VCLKB divided by eight.

The above-described operation of the delay controller and the ⅛ counter for the laser beam A and that for the laser beam B can be controlled separately by the CPU 80. Thus, the scanning line position of the laser beam A and that of the laser beam B can be corrected each in ⅛-dot units and the dot position displacement in the main scanning direction can also be corrected in ⅛-dot units.

Then, the time between the SOS signal and the image write start is moved up 0.5 (⁴⁄₈) dots with respect to the scanning of the laser beam B, whereby the scanning line position of the laser beam B can be backed 0.5 dots in the main scanning direction and the displacement in the main scanning direction in the joint can be corrected, as shown in FIG. 6(C).

Next, fine adjustment of the displacement correction in the main scanning direction in the joint will be described.

Figure 10:
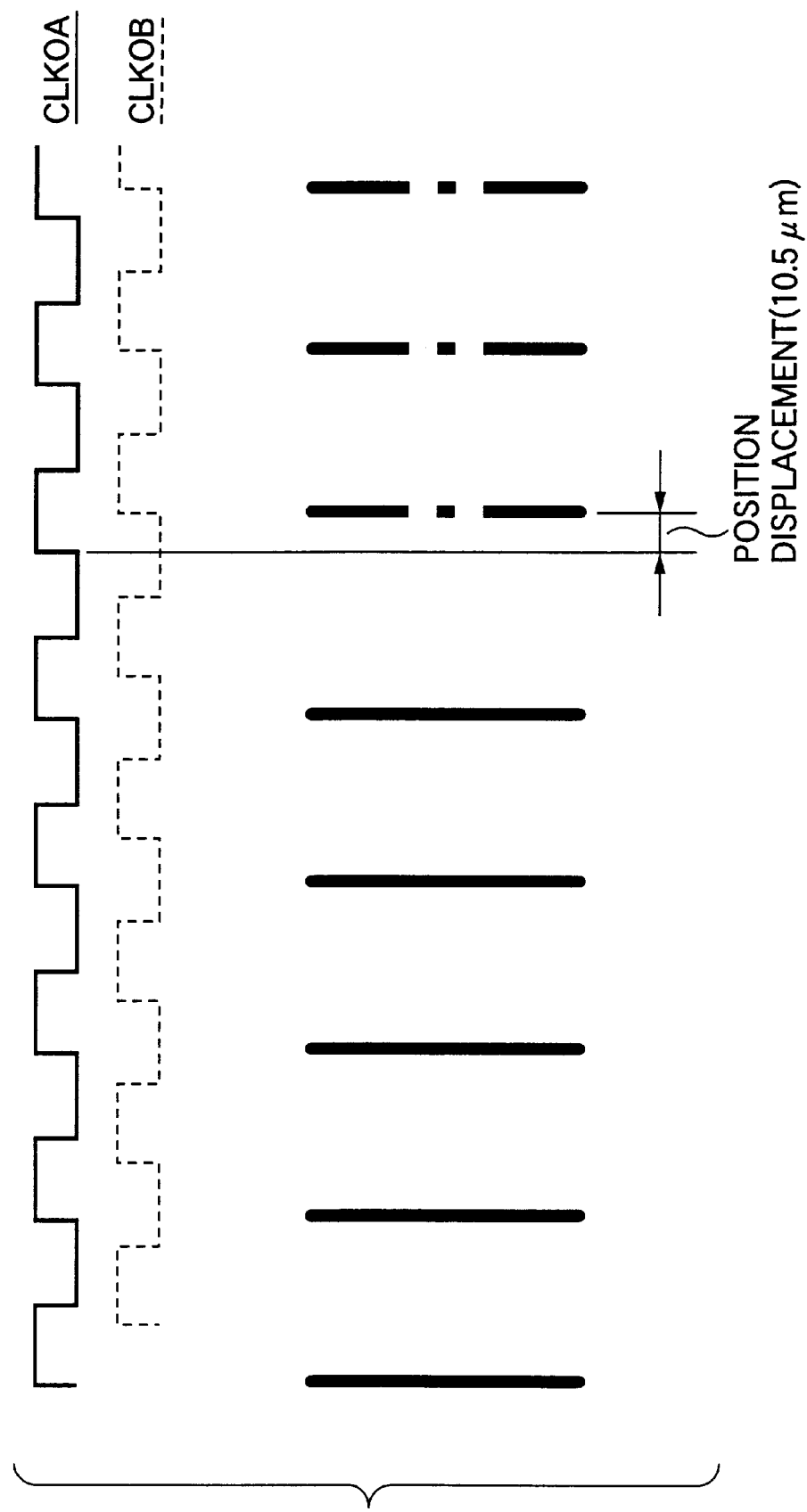
FIG. 10 is an illustration to show a state before displacement in the main scanning direction is finely adjusted.

As shown in FIG. 10, the image clocks CLK0A and CLK0B with different frequencies set do not necessarily match in phase relationship in the vicinity of the joint. Thus, the position of the image formed by the laser beam A is displaced ½ clocks at the maximum from that of the image formed by the laser beam B.

In the embodiment, the emission start timings of the laser beams A and B are adjusted by the predetermined same time responsive to the frequency difference between the image clocks CLK0A and CLK0B, whereby accurate joint match in the main scanning direction is provided, as described below:

For example, assume that the frequency of the image clock CLK0A is lower than that of the image clock CLK0B, that the frequency difference therebetween is 0.3%, and that image position displacement in the joint in FIG. 10 is 10.5 μm.

At this time, if the emission start timings of the laser beams A and B are delayed by one clock, the image position displacement is decreased by (pixel size per clock X frequency difference between clocks). For example, if the scanning density is 600 spi, the image position displacement is decreased by 42.3 μm×0.3%=0.127 μm.

Figure 11:
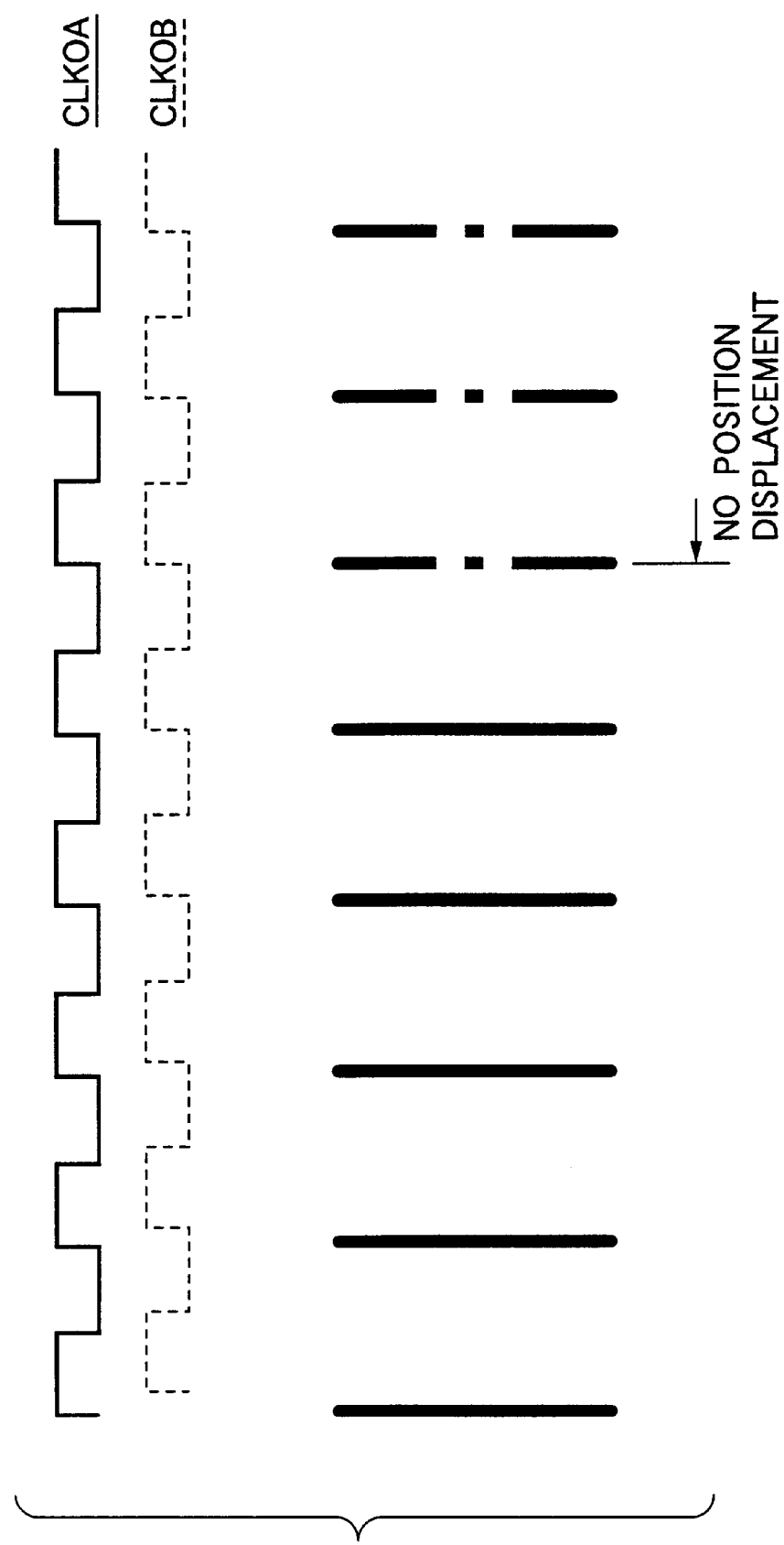
FIG. 11 is an illustration to show a state after displacement in the main scanning direction is finely adjusted.

Therefore, if the emission start timing of each laser beam is delayed by 83 clocks found from 10.5 μm÷0.127 μm, the position displacement in the boundary portion of the areas over which the light beams are scanned can be corrected as shown in FIG. 11.

Next, a procedure of correcting a partial magnification difference will be described.

The registration detection sensors 44A and 44B shown in FIG. 7 detect the print length in a predetermined clock of the first half in the main scanning direction of an image and the registration detection sensors 44B and 44C detect the print length in the predetermined clock of the latter half in the main scanning direction of the image.

Figure 12:
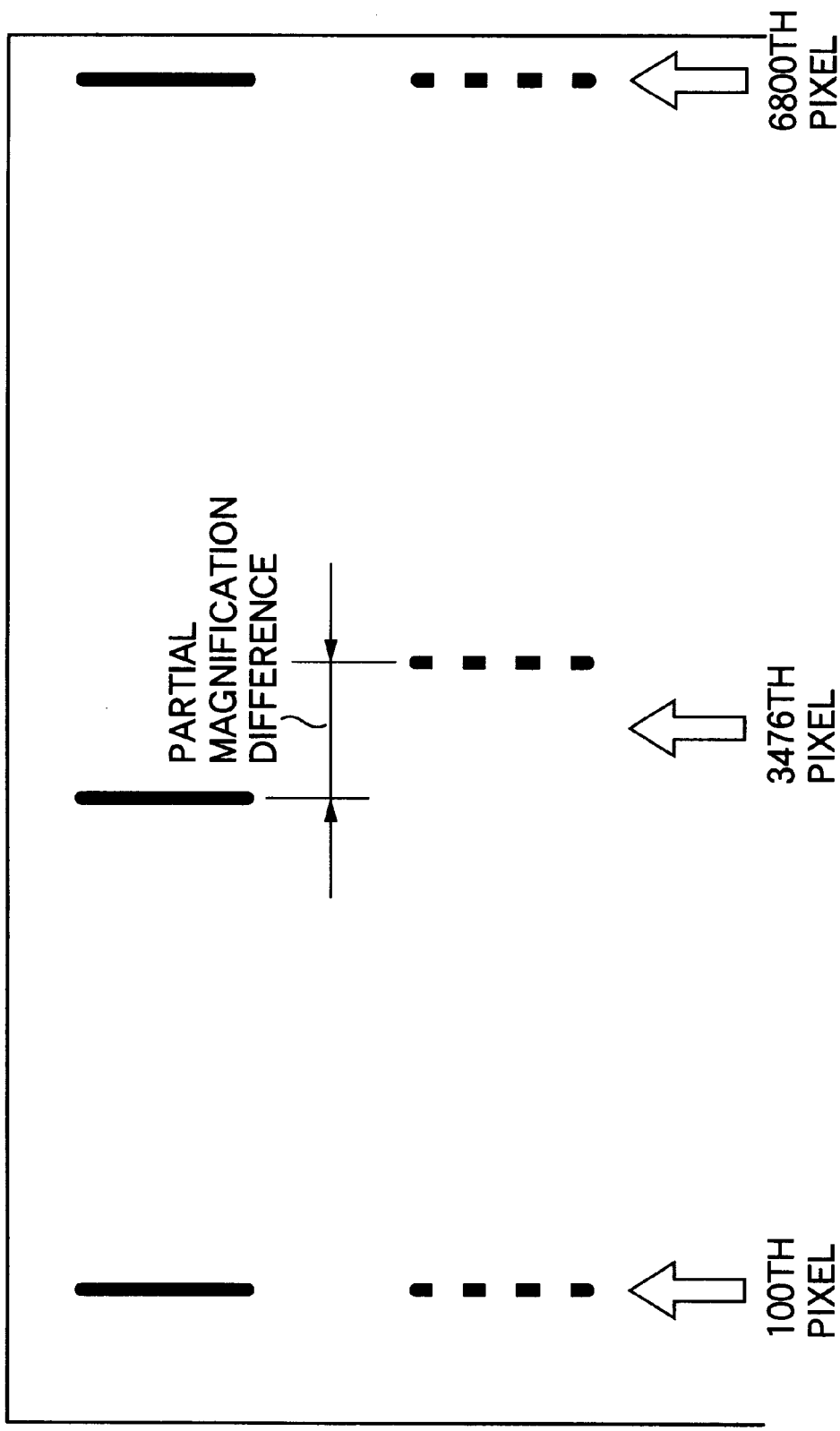
FIG. 12 is an illustration to show a state before color misregistration caused by a partial magnification difference is corrected.

For example, as shown in FIG. 12, a situation may occur in which the magnification of the first half of a cyan color image is smaller than that of the latter half as indicated by solid lines in FIG. 12 and the magnification of the first half of a magenta color image is larger than that of the latter half as indicated by dashed lines in FIG. 12; a partial magnification difference may occur.

Specifically, assume that the first and latter halves of the cyan color image are 99.6% and 100.3% respectively and that the first and latter halves of the magenta color image are 99.8% and 100.1% respectively relative to the reference print length.

In this case, the data to be set in the laser beam frequency dividers 72x in the optical scanners for the colors is changed from the current set values as follows:

For example, assume that the current set values are all initial values 10000. In the optical scanner 24A for cyan, the data to be set in the frequency divider 72A based on a frequency setting signal A is set to 9960 and the data to be set in the frequency divider 72B based on a frequency setting signal B is set to 1030. In the optical scanner 22A for magenta, the data to be set in the frequency divider 72A based on a frequency setting signal A is set to 9980 and the data to be set in the frequency divider 72B based on a frequency setting signal B is set to 1010.

Such control is executed, whereby the magnification of the first half of the image in each color is made equal to that of the latter half for removing a partial magnification difference, so that the image with no color misregistration can be provided as shown in FIG. 13.

In the embodiment, the four-color image forming apparatus is shown as an example, but the invention can also be applied to a single-color image forming apparatus for executing divisional scanning and advantages similar to those described above can be provided.

In the embodiment, one scanning line is divided into two parts and laser beams are scanned over the two parts, but the invention can also be applied to a case where one scanning line is divided into three parts and laser beams are scanned over the three parts, and advantages similar to those described above can be provided.

As described above, according to the invention, if position displacement occurs in the boundary portion of the areas over which the light beams are scanned, it can be corrected with accuracy in the main scanning direction and in the rotation direction of the image carrier (subscanning direction) and degradation of image quality in the boundary portion of the areas over which the light beams are scanned can be avoided.

Further, according to the invention, the clock frequencies corresponding to the light sources are controlled so that the scan distances of the light beams within the predetermined time become equal to each other. Thus, the partial magnification difference in the main scanning direction can be corrected and degradation of image quality in the boundary portion of the areas over which the light beams are scanned can be avoided. It is made possible to effectively correct a color misregistration particularly in a multicolor image forming apparatus.

What is claimed is:

1. An image forming apparatus comprising:
    a plurality of light sources each for modulating and emitting a light beam based on image data at an operation speed responsive to a predetermined clock;
    an optical scanner for deflecting the light beams emitted from said plurality of light sources by a single deflector, dividing one scanning line on an image carrier rotating in a predetermined direction by the deflected light beams, and scanning the light beams over the line in a main scanning direction;
    a detector for detecting a position displacement amount in a boundary portion of areas over which the light beams are scanned; and
    a controller for controlling light beam emission start timings from said light sources or clock frequencies corresponding to said light sources so as to eliminate a displacement amount in the main scanning direction if the position displacement amount detected by said detector contains the displacement amount in the main scanning direction, and for controlling said light sources so as to modulate and emit the light beams based on image data of a scanning line shifted as many lines as the number of lines responsive to a displacement amount in a rotation direction of the image carrier if the position displacement amount contains the displacement amount along the rotation direction.

2. The image forming apparatus as claimed in claim 1, wherein if the position displacement amount contains a displacement amount in the main scanning direction and said light sources differ in clock frequency, said controller adjusts the light beam emission start timings from said light sources by the same time responsive to the clock frequency difference.

3. An image forming apparatus comprising:
    a plurality of light sources each for modulating and emitting a light beam based on image data at an operation speed responsive to a predetermined clock;
    an optical scanner for deflecting the light beams emitted from said plurality of light sources by a single deflector, dividing one scanning line on an image carrier rotating in a predetermined direction by the deflected light beams, and scanning the light beams over the line in a main scanning direction;
    a scan distance detector for detecting a scan distance of each light beam along the main scanning direction within a predetermined time; and
    a frequency controller for controlling clock frequencies corresponding to said light sources so that the scan distances of the light beams detected by said scan distance detector become equal to each other.

* * * * *